(12) United States Patent
Schroeder et al.

(10) Patent No.: US 7,992,456 B2
(45) Date of Patent: Aug. 9, 2011

(54) ANTI-BACKLASH NUT, LEAD SCREW ASSEMBLY AND METHOD

(75) Inventors: Jonathan R. Schroeder, Roscoe, IL (US); Gregory Lyon, Mamaroneck, NY (US)

(73) Assignee: Pacific Bearing Company, Rockford, IL (US)

( * ) Notice: Subject to any disclaimer, the term of this patent is extended or adjusted under 35 U.S.C. 154(b) by 553 days.

(21) Appl. No.: 11/953,270

(22) Filed: Dec. 10, 2007

(65) Prior Publication Data

US 2009/0145252 A1 Jun. 11, 2009

(51) Int. Cl.
F16H 3/06 (2006.01)
F16H 27/02 (2006.01)
F16H 29/02 (2006.01)
F16H 29/20 (2006.01)

(52) U.S. Cl. .......................... 74/89.39; 74/89.42
(58) Field of Classification Search ............... 74/89.42, 74/89.23, 89.39, 89.38; 192/41 R, 45.1; 188/30, 67, 82.8
See application file for complete search history.

(56) References Cited

U.S. PATENT DOCUMENTS

| | | | | |
|---|---|---|---|---|
| 2,228,244 A * | 1/1941 | Baker | | 166/243 |
| 2,348,611 A * | 5/1944 | Davidson | | 188/67 |
| 3,359,792 A * | 12/1967 | Lukens | | 73/167 |
| 4,131,031 A | 12/1978 | Erikson et al. | | |
| 4,210,033 A | 7/1980 | Erikson et al. | | |
| 4,249,426 A | 2/1981 | Erikson et al. | | |
| RE32,433 E | 6/1987 | Erikson et al. | | |
| 4,954,032 A * | 9/1990 | Morales | | 411/289 |
| 5,027,671 A | 7/1991 | Erikson et al. | | |
| 5,303,606 A | 4/1994 | Kokinda | | |
| 5,601,372 A | 2/1997 | Erikson et al. | | |
| 5,732,596 A | 3/1998 | Erikson et al. | | |
| 5,913,940 A | 6/1999 | Erikson et al. | | |
| 5,913,941 A | 6/1999 | Erikson et al. | | |
| 5,937,702 A | 8/1999 | Erikson et al. | | |
| 6,041,671 A | 3/2000 | Erikson et al. | | |
| 6,099,166 A | 8/2000 | Erikson et al. | | |
| 6,117,249 A | 9/2000 | Erikson et al. | | |
| 6,131,478 A | 10/2000 | Erikson et al. | | |
| 6,202,500 B1 | 3/2001 | Erikson et al. | | |
| 6,240,798 B1 | 6/2001 | Erikson et al. | | |
| 6,415,673 B1 | 7/2002 | Erikson et al. | | |
| 6,422,101 B2 | 7/2002 | Erikson et al. | | |
| 6,467,362 B2 | 10/2002 | Erikson et al. | | |
| 7,219,570 B2 | 5/2007 | Erikson et al. | | |
| 7,506,557 B2 * | 3/2009 | Hosokai et al. | | 74/89.42 |
| 2004/0093971 A1 * | 5/2004 | Fujibayashi | | 74/89.42 |

* cited by examiner

Primary Examiner — Justin Krause
(74) Attorney, Agent, or Firm — Reinhart Boerner Van Deuren P.C.

(57) ABSTRACT

A nut for a lead screw assembly, a lead screw assembly and a method for preventing backlash in a lead screw assembly are provided. The nut of the lead screw assembly includes a one-way clutch that permits relative motion of between two nut bodies in a first direction but prevents relative motion in an opposite direction. The one-way clutch preferably includes at least one sprag element that acts between the two nut bodies to permit or prevent relative motion between the two nut bodies of the nut. The lead screw assembly generally incorporates a nut incorporating such a nut. The method generally includes binding the first nut body relative the second nut body to prevent relative motion of the nut bodies in one direction while permitting relative motion in an opposite direction.

6 Claims, 12 Drawing Sheets

FIG. 17 though those embodiments, there is no intent to limit it to those embodiments. On the contrary, the intent is to cover all

ANTI-BACKLASH NUT, LEAD SCREW ASSEMBLY AND METHOD

FIELD OF THE INVENTION

This invention generally relates to lead screw assemblies and more particularly to anti-backlash nuts for lead screw assemblies and even more particularly to anti-backlash nuts for lead screw assemblies that include two nut bodies.

BACKGROUND OF THE INVENTION

Lead screw assemblies are well known devices for providing linear actuation. A lead screw assembly converts rotational motion of a lead screw into rectilinear motion of a nut engaging external threads of the lead screw. Over time, the lead screw threads and corresponding threads of the nut will wear resulting in clearance in the engagement of the nut and the screw. This clearance results in reduced accuracy in controlling the motion of the nut and any object connected to the nut. Also, backlash will occur when the lead screw alternates directions of rotation to reverse the linear movement of the nut.

Prior attempts for overcoming backlash in lead screw assemblies are known, for example U.S. Pat. No. 6,467,362 discloses a nut body that includes two nut bodies that are linearly moveable relative to one another and that are wedged apart by a spring biasing a wedge between the two nut bodies. The wedge biases the two nut bodies apart from one another to adjust their relative position to compensate for the wear in the components. In another embodiment embodiment, a coil spring axially biases the two nut bodies apart.

The present invention is directed toward improvements in relation to anti-backlash nuts.

BRIEF SUMMARY OF THE INVENTION

The present invention has several aspects that may be claimed and stand as patentable independently and individually or in combination with other aspects, including but not limited to the following.

In one aspect, the invention provides an anti-backlash nut that includes two nut bodies that are moveable relative to one another in only a single direction via a one-way clutch that provides a wedging action preventing motion in one direction. The one-way clutch beneficially increases its wedging action as the two nut bodies are urged in the direction in which the clutch prevents relative movement.

One nut arrangement according to this aspect includes a pair of nut bodies and a sprag element acting between the first and second nut bodies. The first and second nut bodies each include threads for engaging external threads of a lead screw. The first and second nut bodies are moveable relative to each other along a linear axis. The first sprag element operably acts between the first and second nut bodies. The first sprag element, in a first state, permits movement of the first nut body relative to the second nut body in a first direction. The first sprag element, in a second state, provides a locking action substantially preventing movement of the first nut body relative to the second nut body in a second direction. The second direction is opposite the first. The sprag element rotates from the first state to the second state in a first rotational direction and rotates from the second state to the first state in a second rotation direction, different than the first rotational direction.

In another aspect, the invention provides an anti-backlash nut assembly including threaded nut bodies and a one way clutch. The threaded nut bodies are moveable relative to each other along a linear axis. The one-way clutch couples the nut bodies such that the nut bodies can move relative to each other in only one direction along the linear axis.

In yet another aspect, the invention provides a method of reducing backlash between a nut and a screw. The method includes translating a first nut body relative to a second nut body from a first relative position to a second relative position. The method also includes locking the first nut body relative to the second body such that the first and second nut bodies are prevented from translating from the second relative position toward the first relative position. The nut bodies are permitted to translate from the second relative position to a third relative position.

Other embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
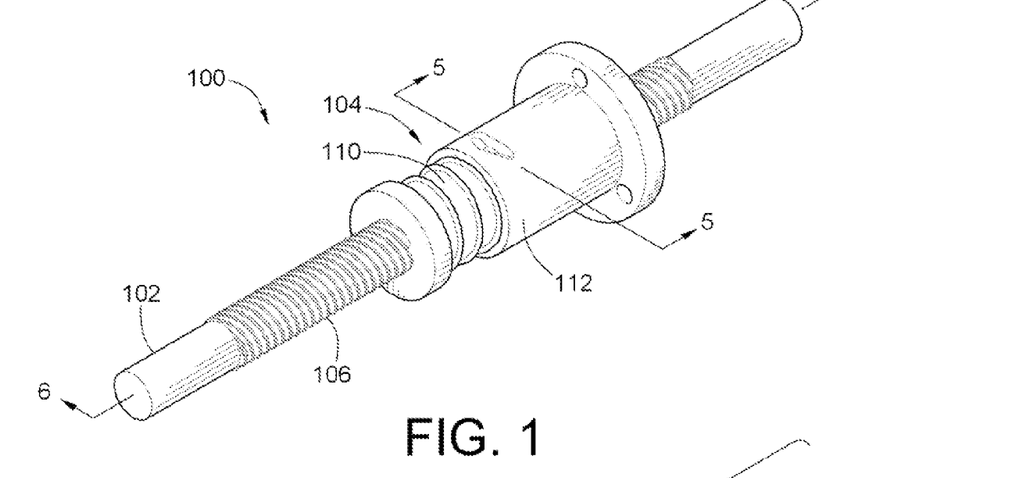
FIG. 1 is a perspective illustration of a first exemplary embodiment of a lead screw assembly in accordance with the teachings of the present invention.
Figure 3:
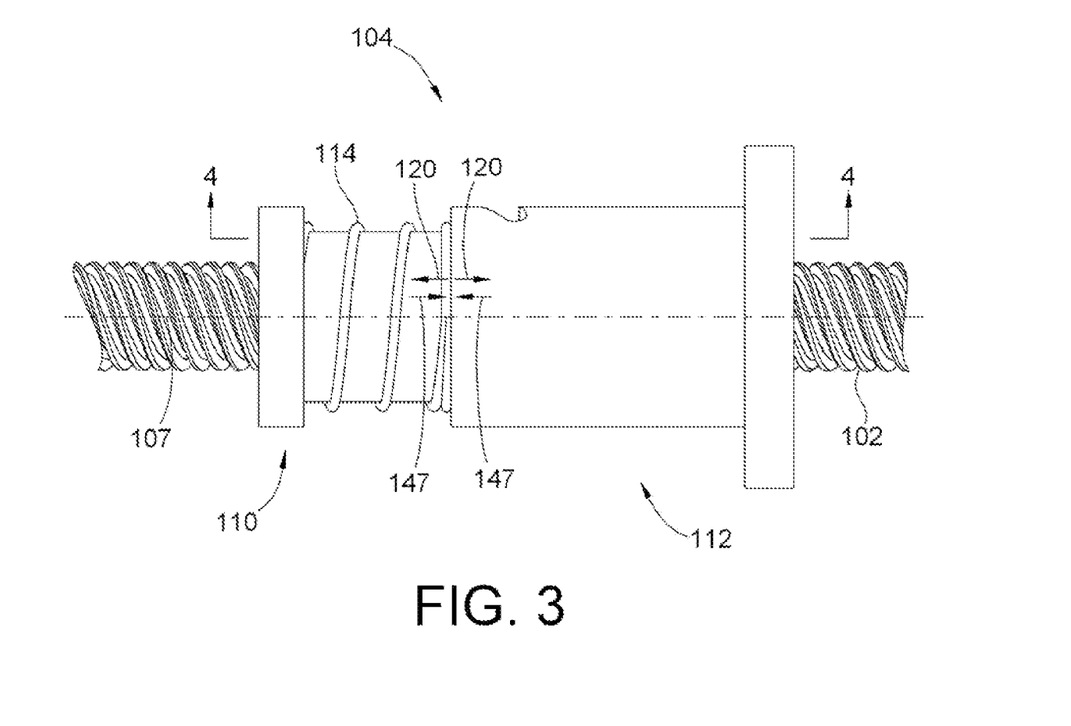
FIG. 3 is a side profile illustration of the lead screw assembly of FIG. 1.

FIG. 1 illustrates a first embodiment of a lead screw assembly 100 according to the present invention. The lead screw assembly 100 generally includes a lead screw 102 and a nut 104 mounted to the lead screw 102. The nut 104 engages the threads 106 of the screw 102. As is well known in the art, the lead screw assembly 100 functions to convert relative rotational movement of the screw 102 and nut 104 into rectilinear motion along the a longitudinal axis. Rotation of the screw 102 in a first direction translates the nut 104 in a first linear direction along an axis 107 (see FIG. 3)of the screw 102 and rotation of the screw 102 in a second direction, opposite the first, translates the nut 104 in a second linear direction along axis 107, opposite the first. Typically, while not shown, the nut 104 is secured to an object that is rectilinear translated along with the linear motion of the nut 104. Further, the object can be used to prevent rotation of the nut 104 along with rotation of the screw 102 to cause the relative rotation between the screw 102 and nut 104.

Figure 2:
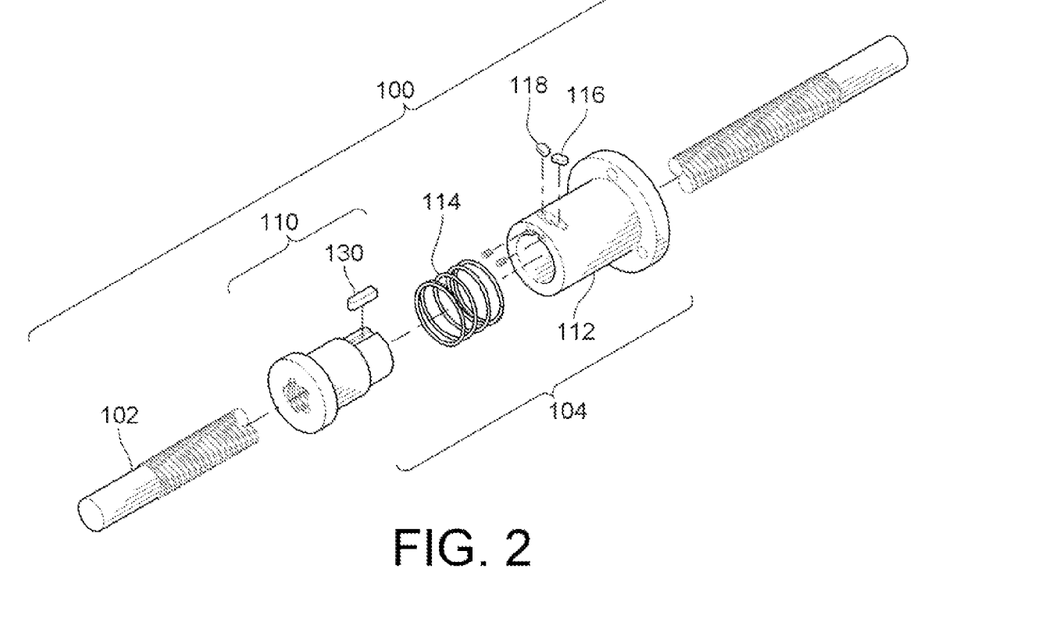
FIG. 2, is an exploded perspective illustration of the lead screw assembly of FIG. 1.

With additional reference to FIG. 2, an exploded illustration of the lead screw assembly 100 of FIG. 1, the nut 104 generally includes two nut bodies 110, 112, a biasing member in the form of coil spring 114 and a pair of sprag elements 116, 118.

Figure 6:
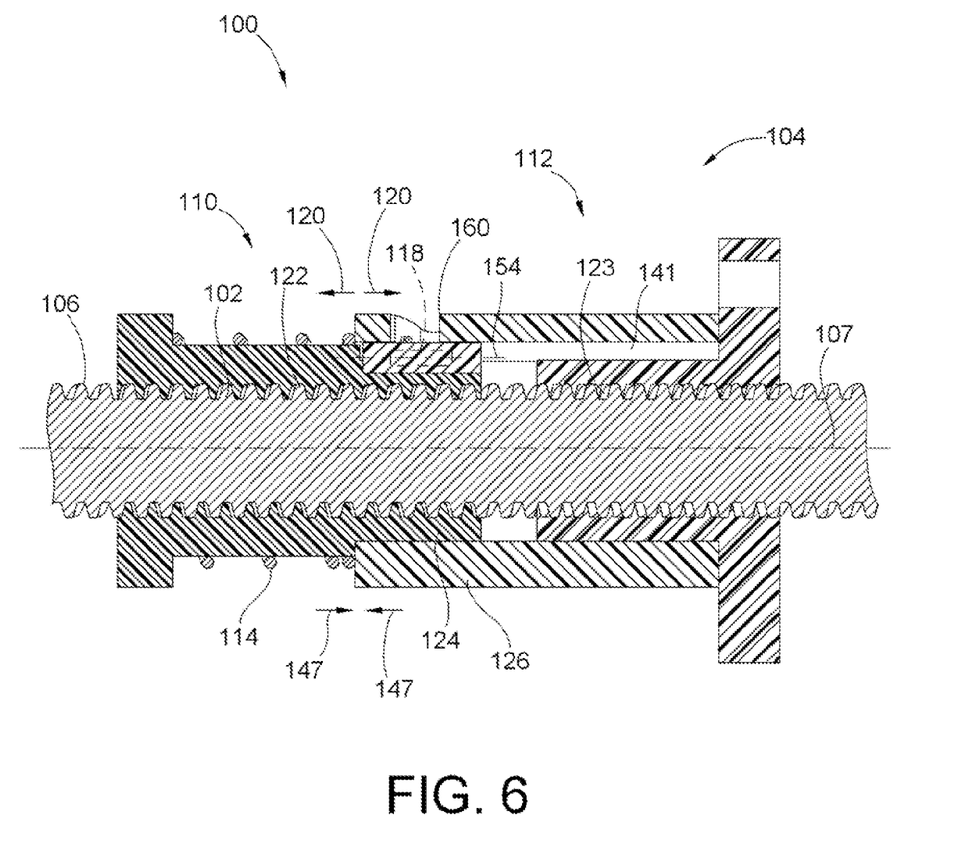
FIG. 6 is a profile cross-sectional illustration of the lead screw assembly of FIG. 1 taken about line 6-6 of FIG. 1.

FIG. 6 illustrates the lead screw assembly in cross-section. The two nut bodies 110, 112 are linearly moveable relative to one another generally along linear axis 107. The coil spring 114 assists in biasing the two nut bodies 110, 112 away from one another, illustrated by arrows 120, to adjust the relative positions of the two nut bodies 110, 112 to compensate for clearance therebetween, such as due to wear of the threads 122, 124 of the two nut bodies 110, 112 or threads 106 of screw 102. By taking up the clearance between the threads 122, 124 of the nut bodies 110, 112 and the threads 106 of the screw 102, the nut 104 removes backlash that would otherwise exist when the screw 102 reverses rotational movement relative to the nut 104.

The two nut bodies 110, 112, as illustrated, are generally annular bodies that include mating sleeve portions 124, 126, respectively. Sleeve portion 124 of nut body 110 is sized to be axially received within and to slide within sleeve portion 126 of nut body 112.

Figure 4:
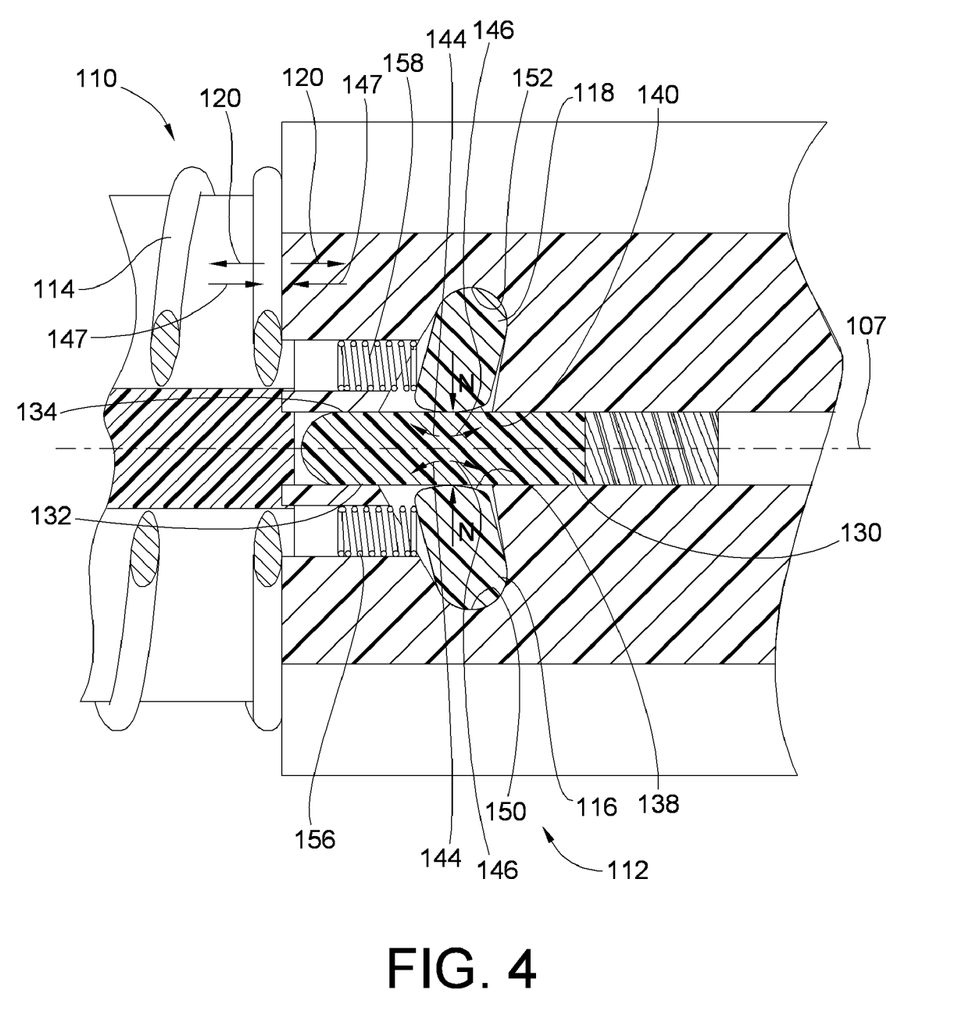
FIG. 4 is a top partial cross-sectional illustration of the lead screw assembly of FIG. 1 about line 4-4 in FIG. 3.
Figure 5:
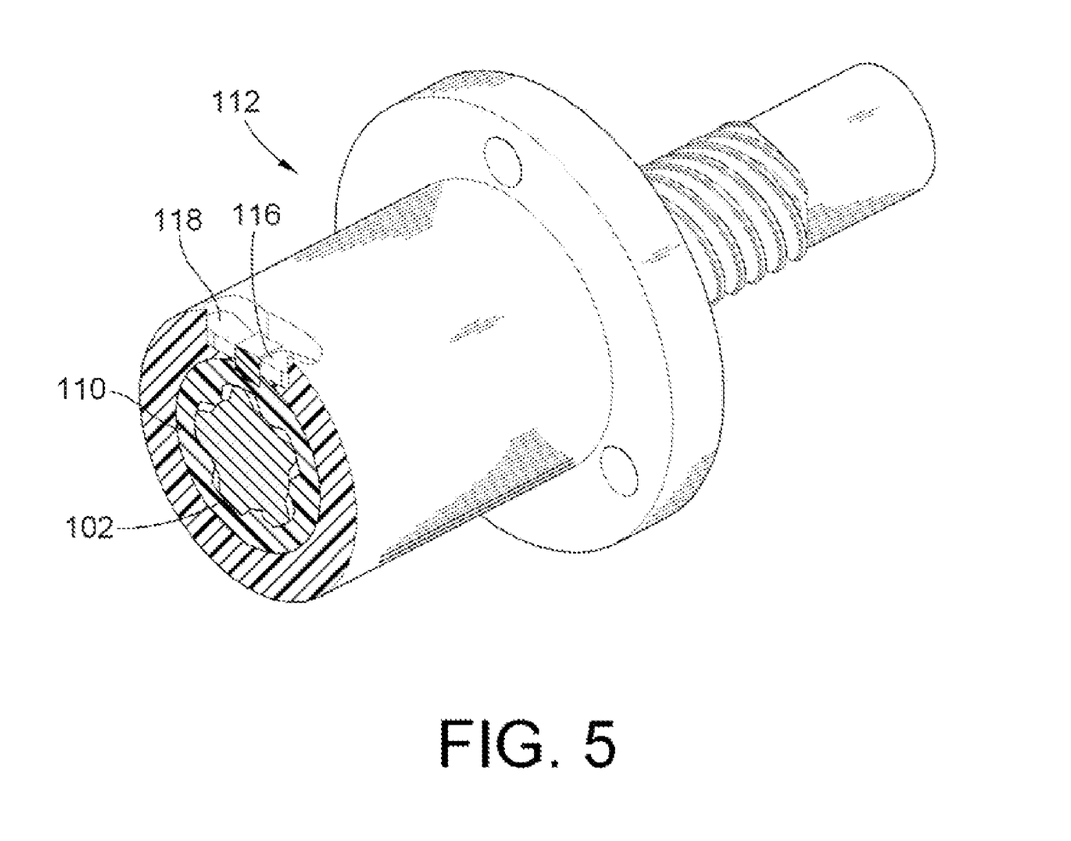
FIG. 5 is a perspective sectioned illustration of the lead screw assembly of FIG. 1 taken about line 5-5 of FIG. 1.

Unlike previous nuts, nut 104 includes a version of a one-way clutch that permits the two nut bodies 110, 112 to move linearly apart, or away from one another in a first state, but prevents the two nut bodies 110, 112 from moving linearly toward one another in a second state. With further reference to FIGS. 4 and 5, the one way clutch is generally provided by the two sprag elements 116, 118 in combination with a key 130 of nut body 110.

Key 130 extends radially outward and defines opposed upstanding sidewalls 132, 134, which form sprag surface engagement surfaces, with which sprag elements 116, 118 interact, respectively, to permit or prevent relative axial motion of the two nut bodies 110, 112. More particularly, the sprag elements 116, 118 include sprag surfaces 138, 140 that interact with sidewalls 132, 134, respectively. The key 130 slides linearly within a groove 141 formed in an inner surface of the sleeve portion 126 of nut body 112.

The angled orientation of the sprag elements 116, 118 relative to key 130 and rotation of the sprag elements 116, 118 permit the transition from the first state to the second state and from the second state to the first state. The sprag elements 116, 118 rotate through an infinitesimal angle from the first state to the second state and from the second state to the first state. This gives the one-way clutch nearly infinite resolution.

Further, the contact angle between the sprag surfaces 138, 140 and key 130 is responsible for the one way action. As long as the tangent of that angle is smaller than the coefficient of friction between the two, the one-way clutch will act in only one direction.

Although the rotation may only be slight, the sprag elements 116, 118 effectively rotate between the first state in which the sprag elements 116, 118 permit axial movement of the two nut bodies 110, 112 away from each other and the second state in which the sprag elements 116, 118 prevent axial movement of the two nut bodies 110, 112 toward each other.

With primary reference to FIG. 4, in the first state, the sprag elements 116, 118 have been effectively rotated in a first direction, illustrated as arrows 144, by the two nut bodies 110, 112 moving axially away from one another, as illustrated by arrows 120. In this condition, the sprag surfaces 138, 140 slide relative to sidewalls 132, 134 as the two nut bodies 110, 112 move away from one another. In this state, the normal force N that the sprag elements 116, 118 apply to the key 130 has a first magnitude, which is less than when the sprag elements 116, 118 are in the second state.

In the second state, the sprag elements 116, 118 have been rotated, ever so slightly, in a second direction, illustrated as arrows 146. In the second state, the sprag elements 116, 118 are wedged between the sidewalls 132, 134 of nut body 110 and abutments 150, 152 of nut body 112. This wedging action prevents the two nut bodies 110, 112 from translating toward one another to compensate for resulting clearance between the nut 104 and screw 102. It is a feature of the use of the sprag elements 116, 118 of the illustrated embodiment that the larger the force applied to bias the two nut bodies 110, 112 toward one another, illustrated by arrows 147, the larger the normal force N that the sprag elements 116, 118 apply to key 130 increasing the frictional force between the sprag elements 116, 118 and key 130 opposing the movement of the two nut bodies 110, 112 toward each other. This occurs because any loading biasing the two nut bodies 110, 112 acts to rotate the sprag elements 116, 118 in the direction of arrows 146, which increases the wedging action of the sprag elements 116, 118 between the two nut bodies 110, 112. The increase in the wedging action causes the normal force N to increase, and consequently the frictional force between the sprag elements 116, 118 and key 130.

The sprag elements 116, 118 of the illustrated embodiment, rotate between the first and second states in a plane 154 (see FIG. 6) that is generally parallel to the linear axis 107 along which the nut 104 translates. Plane 154 extends out of the page in FIG. 6 and is represented by a dashed line. Further, sidewalls 132, 134, with which the sprag elements 116, 118 interact, extend generally within planes that are parallel to axis 107 and generally perpendicular to plane 154

Returning to FIGS. 4 and 5, the one-way clutch of the present embodiment further includes biasing elements in the form of coil springs 156, 158 that bias sprag elements 116, 118 in the second rotational direction 146 such that the sprag surfaces 138, 140 remain in contact with the sidewalls 132, 134. The coil springs 156, 158 prevent the sprag elements 116, 118 from disconnecting from with the key 130 as the nut bodies 110, 112 move apart from one another with the sprag elements 116, 118 rotated into the first state. If the sprag elements 116, 118 are permitted from disconnecting from key 130, in the first state, when the nut bodies 110, 112 transition to being biased toward one another, the sprag elements 116, 118 would not act to prevent the relative movement toward one another.

While the present embodiment uses a coil spring 114 in compression and sprag elements 116, 118 configured to compensate for the clearance and wear by generally maintaining separation between the two nut bodies 110, 112, as illustrated by arrow 120, the orientation of the sprag elements 116, 118 can be reversed. In such an embodiment, the nut bodies 110, 112 would be biased toward one another. Further, it is contemplated that a biasing member urging the nut bodies 110, 112 toward or away from each other need not be used in some embodiments as the mere change in rotational direction of the lead screw may facilitate proper relative displacement of the two nut bodies 110, 112 to compensate for any resultant clearance.

While nut bodies 110, 112 are illustrated as multi-part devices, the two nut bodies 110, 112 could be individual unitary components. Further, one of the nut bodies, nut body 112, in this embodiment, may include retaining structure to secure the sprag elements 116, 118 to the nut bodies 110, 112. As illustrated in FIG. 6, nut body 112 includes an over hang 160 under which a portion of the sprag elements 116, 118 resides to prevent the sprag elements 116, 118 from being removed from the nut body 112.

As illustrated, the nut bodies 110, 112 are annular bodies that entirely surround screw 102. However, the one-way clutch configuration of nut 104 can be implemented in embodiments that are not annular bodies surrounding screw 102. For example, the present invention can be implemented in lead screw assemblies with nuts that have only a portion of the individual nut bodies engaging the screw. This may occur in lead screw assemblies that have reinforcing rails that surround portions of the screw such that only another portion of the circumference the screw is accessible to threads of the nut. Typically, the nut bodies include tongue portions that engage the accessible portion of the screw, such a lead screw assembly in which the present invention can be incorporated is disclosed in U.S. Pat. No. 6,467,362.

Further, while the sprag elements 116, 118 are referred to as rotating from a first state (or first rotational state) to a second state (or second rotational state) and from the second state to the first state, the rotation between the states, particularly from the first state to the second state may merely be provided by infinitesimal movement such as provided by mere deflection in the material of the components of the one-way clutch. For example, the rotation may merely be provided by slight deformation in the sprag elements 116, 118, the key 130 or the nut bodies 110, 112 due to Hertzian contact stresses. This deformation may be either plastic or elastic deformation, but is preferably elastic deformation.

Further, rotation from one state to the other may be provided by transitioning the sprag elements 116, 118 between varying load states, i.e. a load state between the sprag elements 116, 118 and the key 120 that permits slippage between the sprag elements 116, 118 and the key 130 and a second state where slippage is prevented. This is particularly true in embodiments that incorporate springs 156, 158, substantially prevent rotational movement of the sprag elements 116, 118 by maintaining the sprag elements 116, 118 in contact with the key 130. As such, this effective rotation or transition in load states shall be included in the general understanding of rotating from one state to the other.

Figure 7:
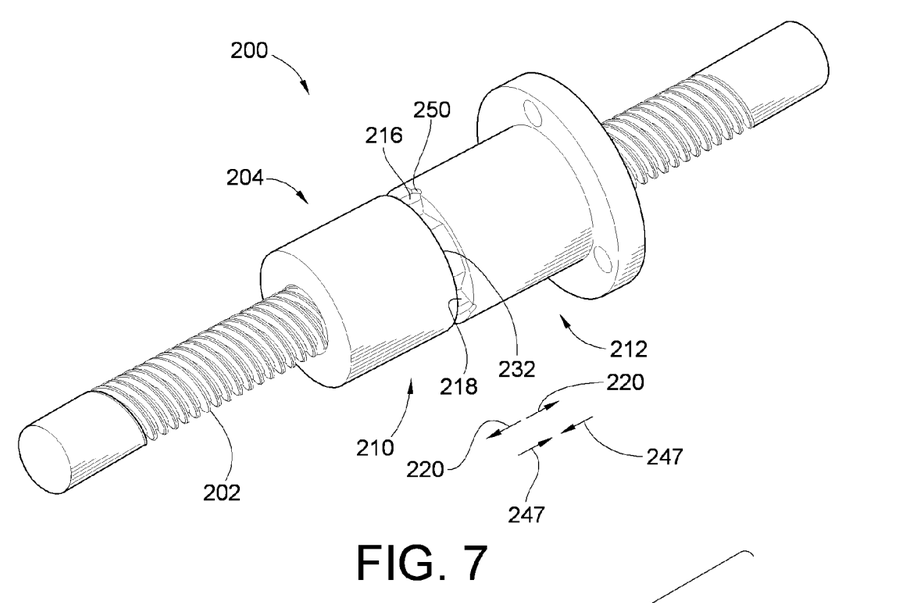
FIG. 7 is a perspective illustration of a second exemplary embodiment of a lead screw assembly in accordance with the teachings of the present invention.
Figure 8:
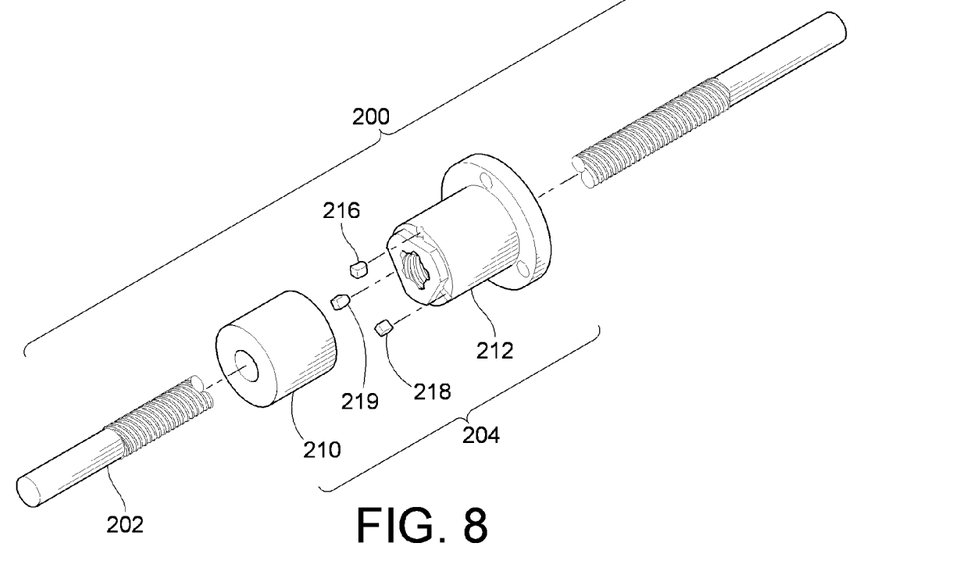
FIG. 8, is an exploded perspective illustration of the lead screw assembly of FIG. 7.

A second embodiment of a lead screw assembly 200 according to the present invention is illustrated in FIG. 7. The lead screw assembly 200 is similar to lead screw assembly 100 of the previous embodiment, and includes a screw 202 and a nut 204. The nut 204 includes two nut bodies 210, 212 and a one-way clutch that permits angular rotation of the two nut bodies 210, 212 relative to one another in a first angular direction and prevents angular rotation in a second angular direction, opposite the first. The permitted one-way relative motion between the two nut bodies 210, 212 is used to compensate for any clearance between the screw 202 and nut 204.

In this embodiment, the one-way clutch arrangement of nut 204 includes three sprag elements 216, 218, 219 that interact between nut bodies 210, 212. The sprag elements 216, 218, 219 are angularly spaced about axis 207. The sprag elements 216, 218, 219 may be described with reference only to a single sprag element for clarity, namely sprag element 216, but the other sprag elements 218, 219 function substantially identically to the others.

Figure 9:
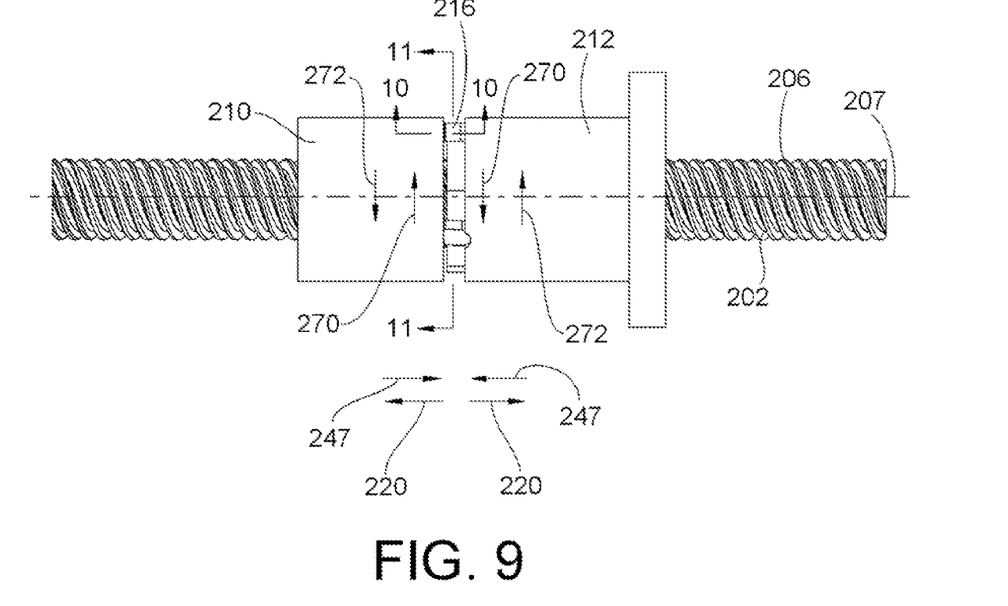
FIG. 9 is a side profile illustration of the lead screw assembly of FIG. 7.
Figure 10:
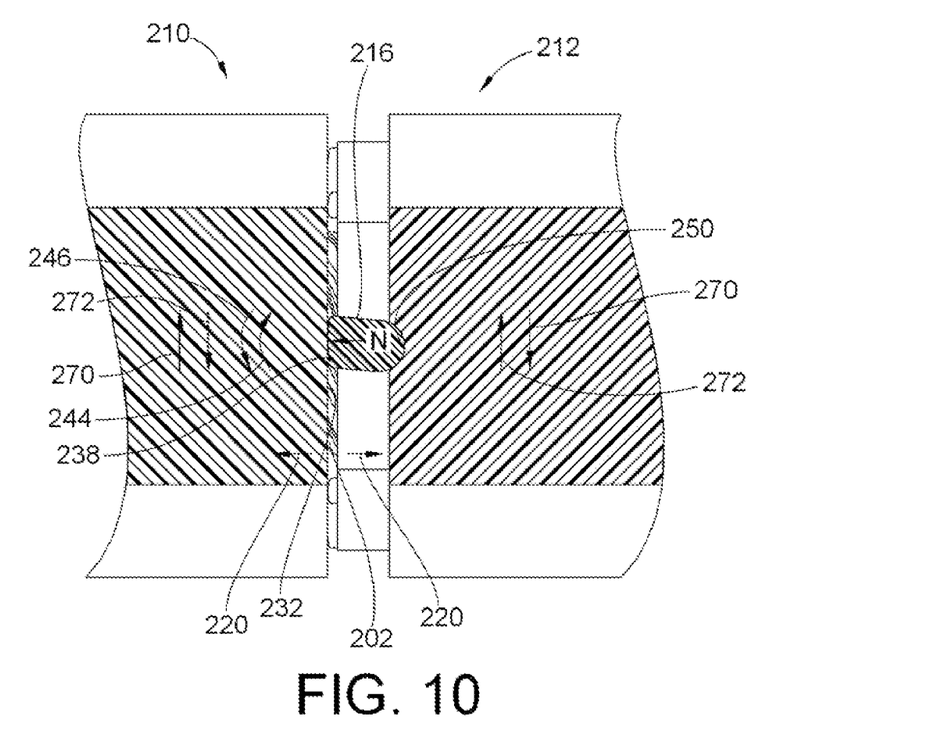
FIG. 10 is a top partial cross-sectional illustration of the lead screw assembly of FIG. 1 about line 10-10 in FIG. 9.
Figure 11:
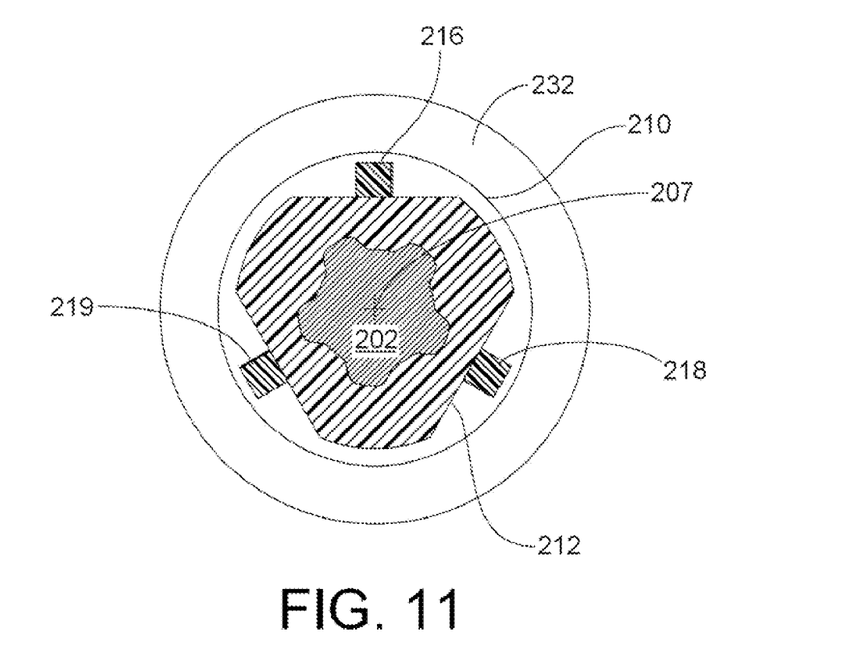
FIG. 11 is an end cross-sectional illustration of the lead screw assembly of FIG. 7 taken about line 11-11 of FIG. 9.
Figure 12:
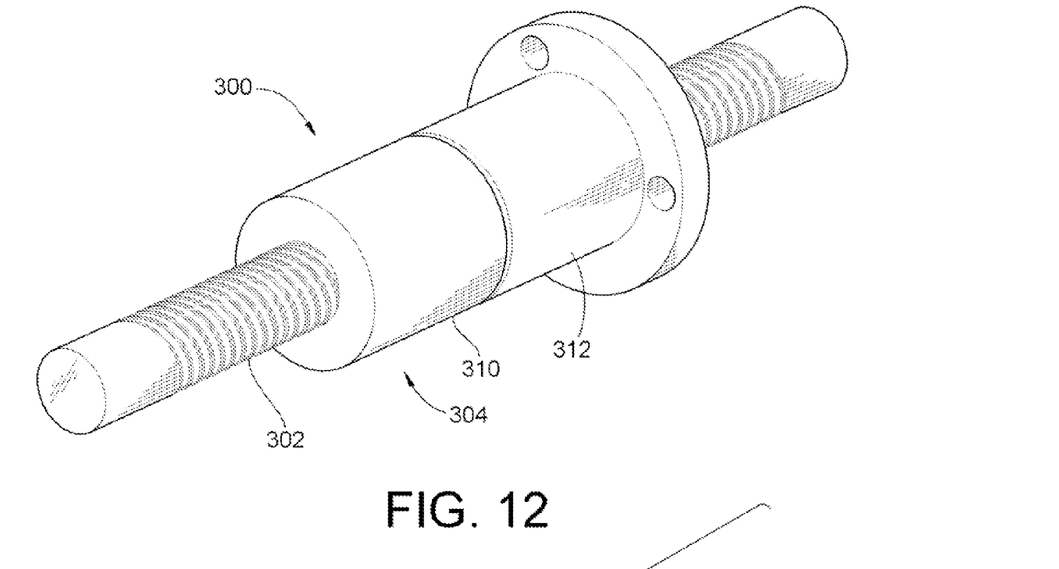
FIG. 12 is a perspective illustration of a third exemplary embodiment of a lead screw assembly in accordance with the teachings of the present invention.

With reference to FIGS. 9 and 10, in a first state, the sprag elements 216, 218, 219 permit the nut bodies 210, 212 to angularly rotate relative to one another in a first direction, illustrated by arrows 270. In a second state, the sprag elements 216, 218, 219 prevent nut bodies 210, 212 from angularly rotating relative to one another in a second direction, illustrated by arrows 272 opposite the first direction.

By allowing the nut bodies 210, 212, to rotate relative to one another in the first direction, nut bodies 210, 212 can linearly translate away from one another because of the interaction of the two nut bodies 210, 212 with threads 206 of screw 202, which forces the two nut bodies 210, 212 away from one another, as illustrated by arrows 220. This permits the nut 204 to compensate for any wear in the nut bodies 210, 212 or threads 206, thereby preventing backlash between the screw 202 and nut 204. In the first state, the sprag surface 238 of sprag element 216 is permitted to slide relative to annular wall 232 of nut body 210 as the two nut bodies 210, 212 rotate angularly relative to one another.

The sprag elements 216, 218, 219, in a second state, prevent relative angular rotation between the two nut bodies 210, 212 in the second direction, illustrated by arrows 272. In the second state, the sprag elements 216, 218, 219 are wedged between the two nut bodies 210, 212. As the nut bodies 210, 212 are urged for relative motion in direction 272, the sprag elements 216, 218, 219 are increasingly wedged between the nut bodies 210, 212 increasing the normal force N applied by the sprag elements 216, 218, 219.

With reference to FIG. 10, the sprag elements 216, 218, 219 rotate between the first and second states. In the first state, the sprag elements 216, 218, 219 have rotated in a first rotational direction illustrated by arrow 244. In the second state, the sprag elements 216, 218, 219 have rotated in a second rotation direction, illustrated by arrow 246, opposite the first rotational direction.

Similar to nut 104, the sprag element 216 is in a wedged condition in the second state. In this embodiment, sprag element 216 is wedged between annular surface 232 of nut body 210 and abutment 250 of nut body 212 in the second state. Further, urging of the two nut bodies 210, 212 in relative direction 272 increases the wedging action of the sprag elements 216, 218, 219 to increase the normal force acting between surface 232 and the sprag elements 216, 218, 219 by urging sprag element 216 to rotate in direction 246.

With the sprag elements 216, 218, 219 in the second state, the two nut bodies 210, 212 are prevented from rotating relative to one another in direction 272. As such, the two nut bodies 210, 212 are prevented from moving axially toward one another (illustrated as arrows 247 in FIG. 7) due to the interaction of the two nut bodies 210, 212 with threads 206 of screw 202 and the relative rotation of the nut bodies 210, 212. However, should clearance occur and the nut bodies 210, 212 rotate relative to one another in the opposite direction, i.e. direction 270, the two nut bodies 210, 212 are permitted to rotate as the sprag elements 216, 218, 219 transition to the first state. As the two nut bodies 210, 212, rotate relative to one another in direction 270, the threads 206 force the two nut bodies 210, 212 apart and compensate for any additional clearance between nut 204 and screw 202.

Thus, the one-way clutch including sprag elements 216, 218, 219 of this embodiment and the one-way clutches of the other embodiments allow a continuous ratcheting effect that allows the two nut bodies to continuously separate to compensate for any wear of the components of the lead screw assemblies. As discussed previously, in embodiments incorporating sprag elements, the ratcheting effect has nearly infinite resolution.

Again, nut 204 could be configured to permit the two nut bodies 210, 212 to move toward one another to compensate for any wear such that the nut would be in a state of compression, as opposed to moving apart with the nut remaining in a state of tension.

In this embodiment, sprag element 216 rotates between the first and second states in a plane generally parallel to the axis 207. The annular surface 232 of nut body 210 which the sprag element 216 engages extends generally perpendicular to the axis 207.

Annular wall 232 acts as a sprag engagement surface upon which the sprag surfaces of the individual sprag elements 216, 218, 219 slip in the first state and with which sprag surfaces of the individual sprag elements 216, 218, 219 engage in the second state. Annular wall 232 is an end wall of nut body 210.

FIGS. 12-17 illustrate a third embodiment of a lead screw assembly 300 according to the present invention. The lead screw assembly 300 includes a lead screw 302 and a nut 304. The nut 304 includes two nut bodies 310, 312 that are permitted to move linearly relative to one another in only a single direction via a one-way clutch that includes a plurality of sprag elements 316, 318, 319.

Similar to nut 204, nut 304 acts to compensate for clearance between the nut 304 and screw 302 by angularly rotating the two nut bodies 310, 312 relative to one another in only a single angular relative direction, namely a direction illustrated by arrows 370. The relative angular motion in direction 370 in combination with the engagement with the threads 306 of the screw 302 causes the two nut bodies 310, 312 to move relative to one another linearly in a direction illustrated by arrows 320 to compensate for any clearance between the screw 302 and nut 304. However, the one-way clutch prevents relative motion in the opposite angular direction illustrated by arrows 372 such that the two nut bodies 310, 312 are prevented from moving toward one another illustrated by arrows 347

Figure 13:
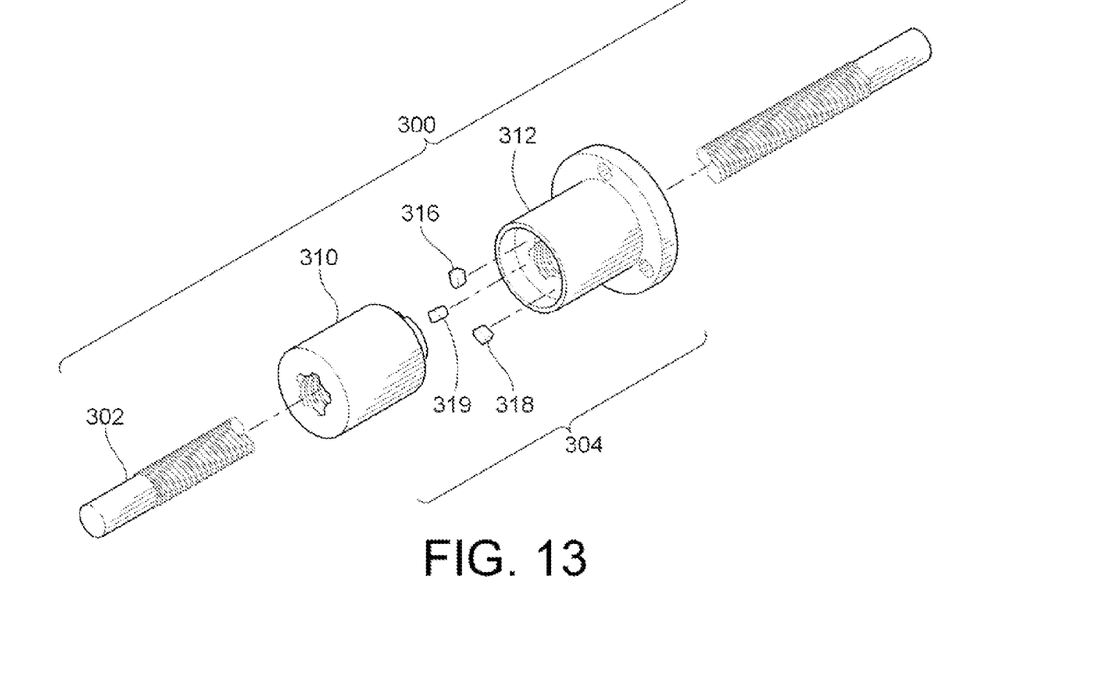
FIG. 13, is an exploded perspective illustration of the lead screw assembly of FIG. 12.
Figure 14:
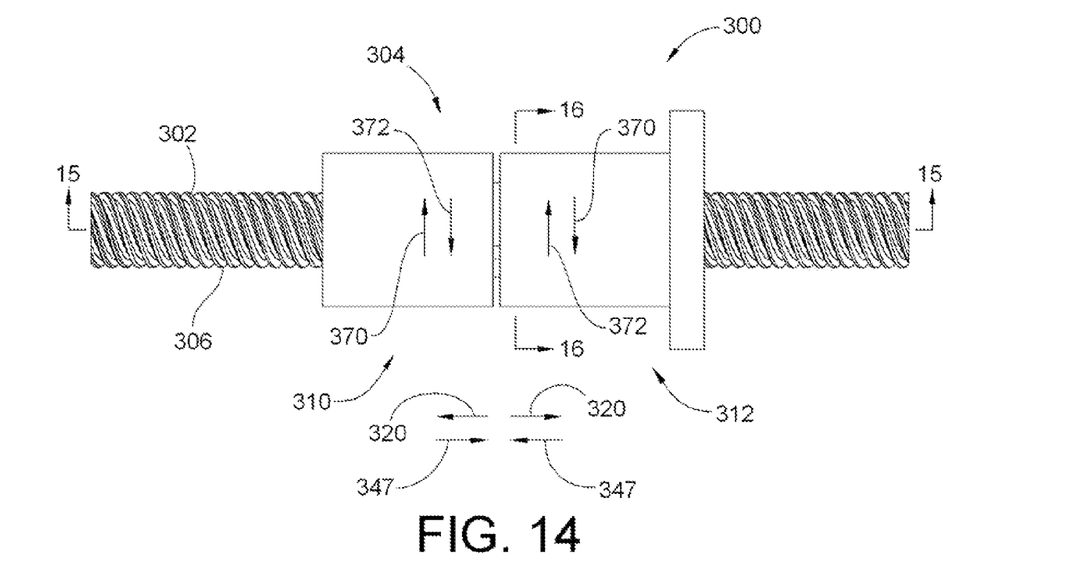
FIG. 14 is a side profile illustration of the lead screw assembly of FIG. 12.

In this embodiment, the two nut bodies 310, 312 include generally annular sleeve portions 324, 326, respectively. Sleeve portion 326 is sized to receive sleeve portion 324 axially therein forming gap 342 therebetween.

Figure 15:
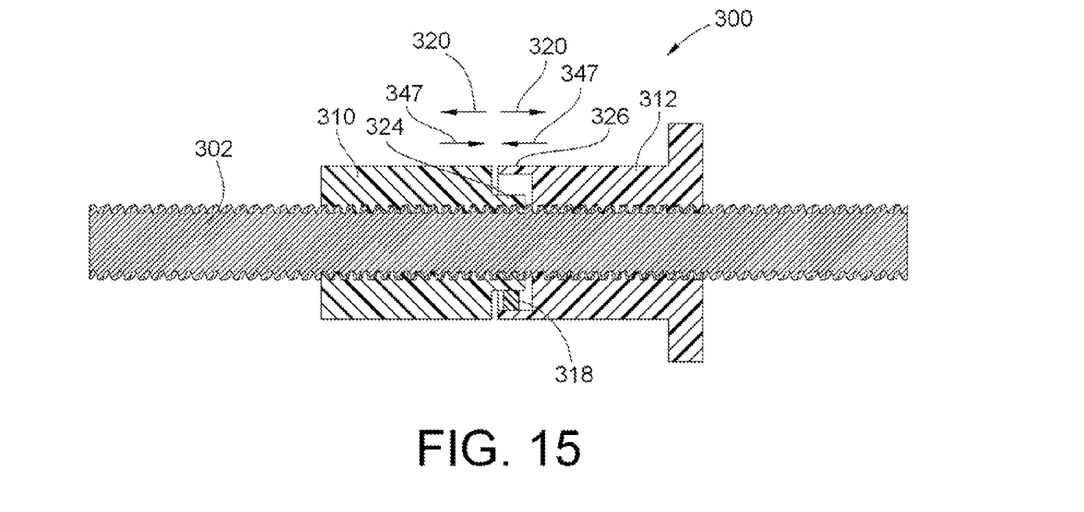
FIG. 15 is a profile cross-sectional illustration of the lead screw assembly of FIG. 12 taken about line 15-15 of FIG. 14.
Figure 16:
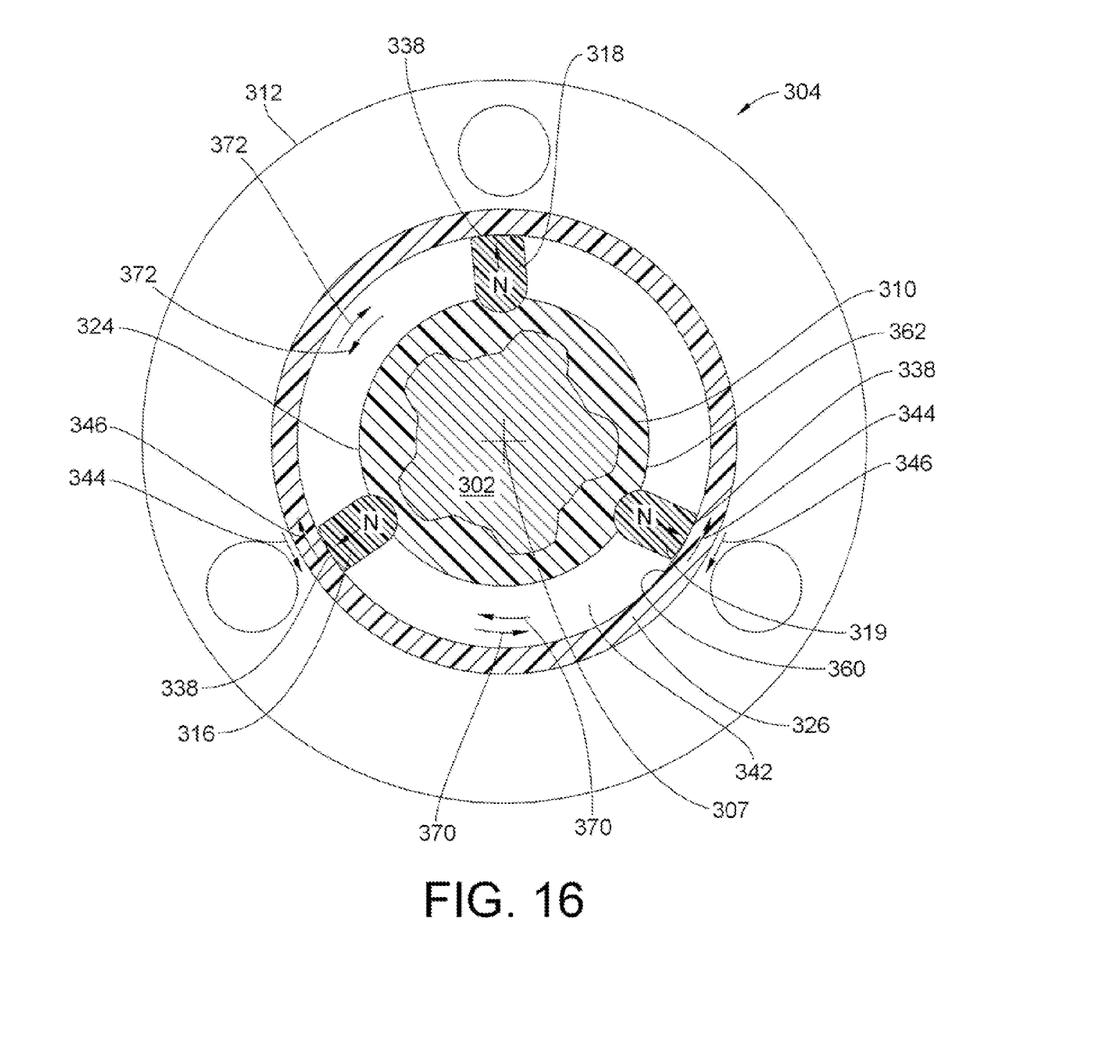
FIG. 16 is an end cross-sectional illustration of the lead screw assembly of FIG. 12 taken about line 16-16 of FIG. 24.
Figure 17:
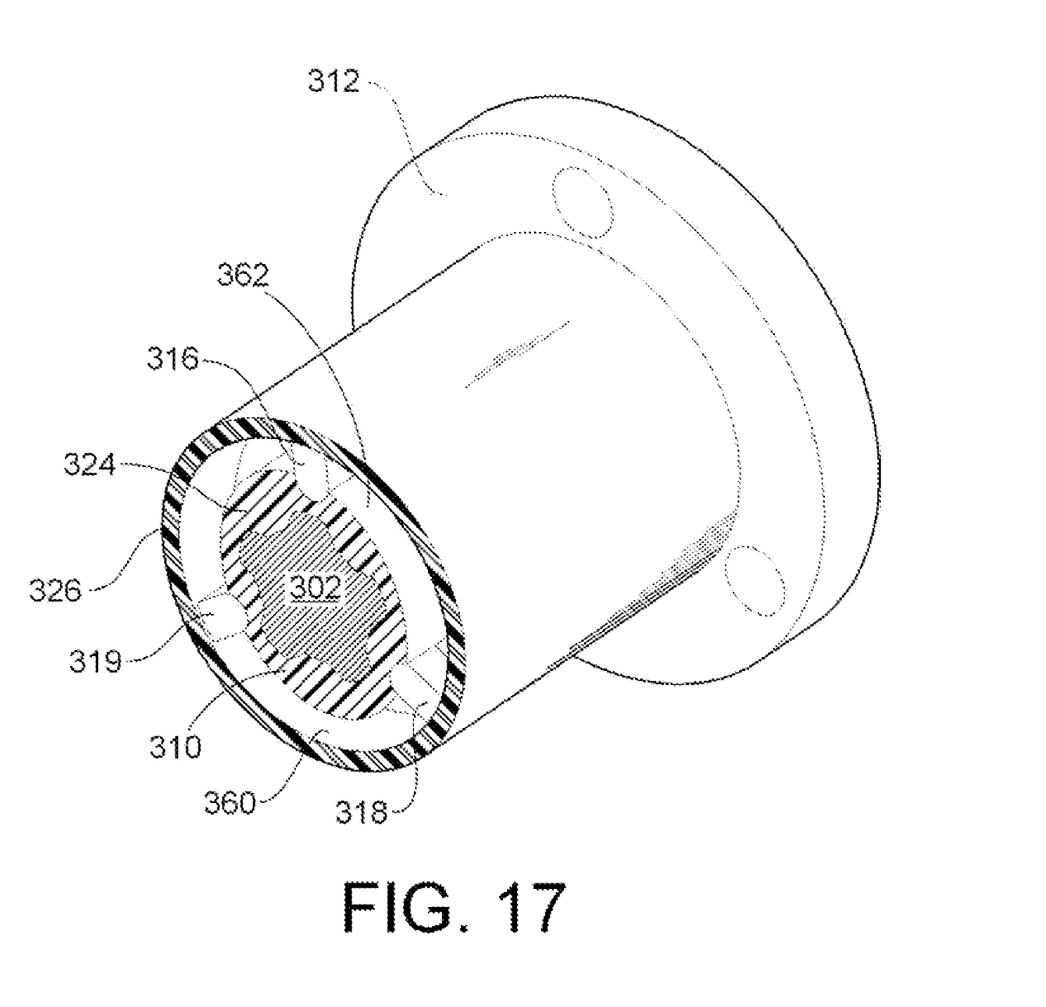
FIG. 17 is a partial perspective illustration of the lead screw assembly of FIG. 12.

Sprag elements 316, 318, 319 reside in gap 342 between the two sleeve portions 324, 326 and are generally radially interposed between the inner surface 360 of sleeve portion 326 and an outer surface 362 of sleeve portion 324. The sprag surfaces 338 of sprag elements 316, 318, 319 provide a generally radially directed normal force N against inner surface 360 of sleeve portion 326.

In the first state, sprag elements 316, 318, 319 have rotated in direction 344 and permit relative rotational movement of the nut bodies 310, 312 in a direction illustrated by arrows. However, in the second state, sprag elements 316, 318, 319 have rotated in direction 346 and provide a wedging action between the two nut bodies 310, 312. This wedging action prevents the relative movement of the nut bodies 310, 312 in the second direction 372, such that the two nut bodies 310, 312 cannot move axially toward one another, such as illustrated by arrows 347.

In this embodiment, the sprag elements 316, 318, 319 rotate in a plane generally perpendicular to axis 307 and the surface with which the sprag elements 316, 318, 319 engage and upon which they slide depending on the state they are in angularly surrounds axis 307.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An anti-backlash nut for engaging external threads of a lead screw, the nut comprising:

first nut and second nut bodies, each nut body including threads for engaging the external threads, the first and second nut bodies moveable relative to each other along a linear axis; and a first sprag element operably acting between the first and second nut bodies, the first sprag element, in a first state, permitting movement of the first nut body relative to the second nut body in a first direction, and the first sprag element, in a second state, providing a locking action substantially preventing movement of the first nut body relative to the second nut body in a second direction, the second direction being opposite the first;

wherein the first sprag element rotates from the first state to the second state in a first rotational direction and rotates from the second state to the first state in a second rotation direction, different than the first rotational direction;

wherein the first nut body includes a first sprag engagement surface, and the first sprag element includes a first sprag surface engaging the first sprag engagement surface, the first sprag element, first nut body and second nut body configured such that the first sprag surface is permitted to slip relative to the first sprag engagement surface in the first state and configured such that the first sprag surface engages the first sprag engagement surface substantially without slip in the second state;

wherein in the first state the first sprag element applies a first normal force to the first sprag engagement surface, and in the second state the first sprag element applies a second normal force to the first sprag engagement surface, the second normal force being greater than the first normal force;

wherein the first nut body includes an upstanding wall extending generally parallel to the linear axis, the upstanding wall including the first sprag engagement surface;

further comprising a second sprag element engaging a second sprag engagement surface of the upstanding wall formed on an opposite side of the upstanding wall as the first sprag engagement surface, wherein the first sprag element and first sprag engagement surface are symmetrically arranged about the linear axis relative to the second sprag element and second sprag engagement surface, respectively;

wherein the first and second sprag elements are carried by the second nut body; and wherein the second body includes an opening for receipt of a portion of the first nut body, the opening including a keyway, and wherein the first and second sprag elements are carried within a pocket of the second nut body, the pocket extending through an outer diameter of the second nut body and opening into the keyway such that the first and second sprag elements extend into the keyway.

2. The nut of claim 1, wherein the pocket is formed in an annular wall of the second nut body, and wherein the first and second sprag elements are movable within the pocket between the first state and the second state.

3. The nut of claim 1, wherein the upstanding wall is formed by a key secured in a groove formed in an outer surface of the first nut body.

4. The nut of claim 1, further including a biasing member biasing the sprag element in the second rotational direction.

5. The nut of claim 1, wherein the first sprag element rotates in a plane generally parallel to the linear axis.

6. The nut of claim 5, wherein the first sprag engagement surface extends generally perpendicular to the linear axis.

* * * * *